United States Patent Office 3,419,486
Patented Dec. 31, 1968

3,419,486
PHOTOCHEMICAL PRODUCTION OF
β-CHLOROETHANE SULFOCHLORIDE
Walter Schenk, Bad Durkheim, and Hans Stanger, Ludwigshafen (Rhine), Germany, assignors to Badische Anilin- & Soda-Fabrik Aktiengesellschaft, Ludwigshafen (Rhine), Germany
No Drawing. Filed July 28, 1964, Ser. No. 385,787
Claims priority, application Germany, Aug. 8, 1963,
B 73,048
5 Claims. (Cl. 204—162)

ABSTRACT OF THE DISCLOSURE

Production of β-chloroethane sulfochloride by reacting ethane, sulfur dioxide and chlorine in a molar ratio of $SO_2$:ethane of 1:1 to 1.5:1 and of $Cl_2$:ethane of 2:1, in an inert solvent and under high-energy radiation, e.g. rays of a wavelength of 200–500 microns, preferably at a temperature of $-5°$ C. to $+20°$ C. Hydrogen chloride gas is preferably introduced at the beginning of the reaction in an amount of 0.01 to 10 mole percent with reference to the ethane. The β-chloroethane sulfochloride product can be converted to vinylsulfonic acid or vinyl sulfonic acid esters which are useful monomers, e.g., for the production of ion exchange resins when copolymerized with styrene.

---

This invention relates to a process for the production of β-chloroethane sulfochloride from ethane, sulfur dioxide and chlorine.

It is known that β-chloroethane sulfochloride, with 1,1-dichloroethane and varying amounts of sulfuryl chloride is formed when chlorine is passed into a mixture of sulfur dioxide and ethyl chloride with exposure to light.

A process for the continuous production of β-chloroethane sulfochloride from ethyl chloride, chlorine and sulfur dioxide under the action of high-energy radiation is also known according to which the reactants are passed continuously into a mixture of β-chloroethane sulfochloride, 1,1-dichloroethane, ethyl chloride and sulfur dioxide, high-energy rays are allowed to act on the mixture, the mixture is then fractionally distilled and unreacted ethyl chloride, sulfur dioxide and any 1,1-dichloroethane are returned to the reactor.

It is an object of this invention to provide a new process for the production of β-chloroethane sulfochloride according to which ethane is reacted in a single operation in the liquid phase with chlorine and sulfur dioxide and β-chloroethane sulfochloride is obtained in good yields. It is another object of this invention to provide a process for the production of β-chloroethane sulfochloride in which formation of byproducts is kept low.

Another object of the invention is to provide a solvent which is particularly suitable in the preparation of β-chloroethane sulfochloride.

We have found that β-chloroethane sulfochloride is obtained in a very simple way and in good yields by reacting ethane, sulfur dioxide and chlorine in the liquid phase under the action of high-energy radiation and/or in the presence of substances which form free radicals, and then fractionally distilling the reaction mixture.

The reaction is carried out in the presence of inert solvents. Thus chlorinated hydrocarbons having one to four carbon atoms, such as carbon tetrachloride, chloroform, ethylene chloride or perchloroethylene, may be used. Mixtures of these substances may also be used.

The reaction mixture formed by the sulfochlorination of ethane, which is composed of β-chloroethane sulfochloride and ethanes chlorinated in varying degrees, is a particularly suitable solvent because ethane and sulfur dioxide dissolve particularly well therein, which makes for particularly good conversion.

In carrying out the process it is advantageous to use at least 1 mole, preferably 1.1 to 1.3 moles, of sulfur dioxide and 2 moles of chlorine for each mole of ethane. In this way, no unreacted chlorine is withdrawn in the off-gas and there is always an excess of about 10 to 30% of sulfur dioxide in the reactor.

For example ethane, sulfur dioxide and chlorine may be dissolved in the lower part of a reaction tube filled with the reaction mixture and the solution then passed through a zone irradiated by short-wave light. To achieve a rapid initiation of the reaction, hydrogen chloride may be introduced into the reactor at the beginning of the reaction, for example in an amount of 0.01 to 10 moles percent with reference to ethane. By using frits, nozzles or other gas-distributing means, an intimate mixing of the reaction components with the solvent is achieved and at the same time the formation of byproducts is suppressed. The whole of the chlorine may be passed into the mixing zone of the reactor with the sulfur dioxide and ethane. To achieve a good yield of sulfochloride, and to exclude secondary reactions by excessive chlorination, a portion of the chlorine required may be introduced at a point downstream of the point of introduction of ethane, sulfur dioxide and the remainder of the chlorine.

The reaction temperature may lie within a wide temperature range depending on the procedure chosen. It is preferred to carry out the process at temperatures between for example $-5°$ C and $+20°$ C.

High-energy rays include particularly rays having a wavelength of 200 to 500 microns. The light source for irradiation may be for example a fluorescent tube, a mercury vapor-lamp or sources of actinic rays. The reaction may also be carried out in the presence of substances forming free radicals, such as organic peroxides, lead tetraethyl, hydrazo compounds, azo compounds or aluminum alkyls.

It is relatively simple to process the reaction mixture. Removal of excess sulfur dioxide and any chlorine and sulfuryl chloride formed and also of hydrogen chloride may be effected by simple heating to about 60° C. under subatmospheric pressure, for example at 200 to 100 mm. Hg, or by blowing nitrogen or air through the mixture, and chlorethanes formed as byproducts are distilled off at the same time. By cooling the off-gas to about $-15°$ C., excess sulfur dioxide may be condensed and then returned to the reaction cycle. Unreacted ethane may be returned to the reactor after the off-gas free from sulfur dioxide has been passed through water heated to about 90° to 120° C. so that hydrogen chloride gas is completely absorbed. The process may be made continuous in this way. The β-chloroethane sulfochloride formed may readily be recovered by fractional distillation from the reaction mixture which has been freed from readily volatile constituents.

The β-chloroethane sulfochloride obtainable by this process is suitable for the preparation of vinylsulfonic acid or vinylsulfonic esters. Thus, for example, methylvinyl sulfonate is obtained in a very simple way by reacting β-chloroethane sulfonic chloride with methanolic caustic soda solution. This ester is suitable for the production of polymers. By copolymerization with styrene valuable ion exchange resins are obtained.

The invention is illustrated by the following examples. The parts specified in the examples are parts by weight.

Example 1

2000 parts of carbon tetrachloride per hour is pumped downwardly through a vertical double glass tube 1 meter in length, one arm of which is provided with a cooler and is filled with Raschig rings, while each hour 60 parts of ethane, 192 parts of sulfur dioxide and 284 parts of chlorine together with 6 parts of hydrogen chloride are passed countercurrent upwardly through radially divided glass frits. For lighting the other arm of the tube a 100-watt fluorescent tube is used which projects into the tube. The reaction has been completely initiated after about five minutes, this being evident from a vigorous disengagement of hydrogen chloride gas and by a rise in the reaction temperature. The temperature is then kept at about +5° to +10° C. by means of the cooler.

To process the reaction solution, hydrogen chloride and sulfur dioxide are expelled by means of a stream of nitrogen and the solution is then fractionally distilled. The carbon tetrachloride used as solvent together with 49 parts of 1,1-dichloroethane and 18 parts of 1,1,1-trichloroethane formed as byproducts are first distilled off at atmospheric pressure. In the subsequent vacuum distillation at 10 mm. Hg, 3.2 parts of 1,1,2-trichloroethane, 6 parts of 1,1,1,2-tetrachloroethane, 18 parts of ethane sulfochloride and, at 780 C., 186 parts of pure β-chloroethane sulfochloride.

Example 2

The apparatus used is a circulatory apparatus essentially consisting of two vertical glass tubes, each 4 meters in length, and two horizontal tubes connected therewith, one vertical arm serving as a reaction zone and being irradiated by powerful fluorescent tubes, while the other vertical arm contains a cooling coil for withdrawal of the reaction heat. Before the apparatus is started up, it is filled with a reaction solution having the following composition:

68% by weight of β-chloroethan sulfochloride, 12% by weight of sulfur dioxide, 1.5% by weight of sulfuryl chloride and 18.2% by weight of chloroethanes. This reaction solution corresponds in composition to the reaction mixture specified in Example 1. 1800 parts of ethane, 4600 parts of sulfur dioxide and 500 parts of hydrogen chloride are continuously injected per hour through several nozzles into the lower unilluminated portion of the reaction tube and dissolved in the reaction mixture. At a subsequent point, prior to the entry of the reaction mixture into the illuminated portion of the reaction zone, another 9200 parts of chlorine per hour is introduced. After reaction has commenced, a vigorous disengagement of hydrogen chloride takes place in the upper portion of the illuminated zone, so that green colored reaction liquid in the lower portion becomes paler as it flows upward and is finally completely decolorized upon leaving the reaction zone. The upward movement produced by the vigorous disengagement of hydrogen chloride causes automatic circulation of the whole liquid in the circulatory system so that an upward flow of liquid is set up in the illuminated zone and a downward flow in the reflux portion which is provided with cooling means. The cooling keeps the liquid temperature in the reflux portion of the apparatus at about +5° C.

In the upper portion of the reflux section of the circulatory apparatus, which forms a tranquilizing zone, the hydrogen chloride formed by the reaction, together with the remaining gas mixture, separates from the reaction solution and is absorbed in a trickling tower charged with water at 90° to 110° C., while the residual gas consisting mainly of unreacted sulfur dioxide and ethane is dried in a further trickling tower with concentrated sulfuric acid and returned to the reaction cycle through a gas circulating pump.

The amount of newly-formed liquid reaction product is withdrawn from the tranquilizing chamber by means of an overflow which maintains the liquid level, and is fractionally distilled. The constituents which pass over up to a bottoms temperature of 75° C. (consisting mainly of sulfur dioxide and small amounts of chloroethane and sulfuryl chloride) are returned to the reaction cycle. By fractional distillation of the remaining bottoms, 8590 parts of β-chloroethane sulfochloride, 1383 parts of chlorinated ethanes, 152 parts of sulfuryl chloride and 745 parts of residue are obtained per hour.

We claim:
1. In a process for the reaction of ethane, sulfur dioxide and chlorine under the action of high-energy radiation in an inert solvent as a liquid phase reaction medium, the improvement for preferentially producing β-chloroethane sulfochloride which comprises reacting about 1 to 1.5 moles of sulfur dioxide and about 2 moles of chlorine for each mole of ethane, with hydrogen chloride gas being introduced into said reaction medium at the beginning of the reaction in an amount of about 0.01 to 10 mole percent with reference to the ethane.

2. A process as claimed in claim 1 wherein the reaction mixture itself is used as the inert solvent.

3. A process as claimed in claim 1 wherein the reaction temperautre is between about —5° C. and +20° C.

4. A process as claimed in claim 3 wherein said high-energy radiation consists essentially of rays having a wavelength of 200 to 500 microns.

5. A process as claimed in claim 3 wherein there are reacted about 1.1 to 1.3 moles of sulfur dioxide and about 2 moles of chlorine for each mole of ethane.

References Cited

UNITED STATES PATENTS 2,046,090   6/1936   Reed _____ 260—99.1
2,352,097   6/1944   Herold et al. _____ 204—162

HOWARD S. WILLIAMS, Primary Examiner.

U.S. Cl. X.R.

260—543